United States Patent [19]
Gibson

[11] Patent Number: 5,093,067
[45] Date of Patent: Mar. 3, 1992

[54] INJECTION MOLDING OF FABRIC REINFORCED ELASTOMERIC DIAPHRAGMS

[75] Inventor: Christopher M. Gibson, San Pedro, Calif.

[73] Assignee: Allied-Signal Inc., Morris Township, Morris County, N.J.

[21] Appl. No.: 369,570

[22] Filed: Jun. 21, 1989

Related U.S. Application Data

[63] Continuation-in-part of Ser. No. 167,613, Mar. 14, 1988, abandoned.

[51] Int. Cl.$^5$ ............................................. B29C 45/14
[52] U.S. Cl. ........................................ 264/257; 264/273; 264/279; 264/328.1; 425/116; 425/129.1; 425/543
[58] Field of Search ..................... 264/257, 279, 271.1, 264/275, 258, 328.1, 273; 425/116, 129.1, 543

[56] References Cited

U.S. PATENT DOCUMENTS

| | | | |
|---|---|---|---|
| 2,903,389 | 9/1959 | Fujita | 264/257 |
| 3,032,462 | 5/1962 | Saporito | 264/257 |
| 3,087,201 | 4/1963 | Williams | 264/257 |
| 3,137,750 | 6/1964 | Gringras | 264/257 |
| 3,761,560 | 9/1973 | Newlove | 264/257 |
| 4,091,061 | 5/1978 | Turbier | 264/257 |

Primary Examiner—Jay H. Woo
Assistant Examiner—Jeremiah F. Durkin, II
Attorney, Agent, or Firm—David B. Abel; Terry L. Miller; Robert A. Walsh

[57] ABSTRACT

A method of injection molding and a mold for the forming of a thin walled fabric reinforced elastomeric diaphragm. According to the method, a thin, precut, preformed sheet of fabric material is placed within a suitable injection mold cavity. Subsequently, a high molecular weight elastomer is injected into the mold cavity in a controlled manner to prevent migration or weave distortion of the fabric material.

12 Claims, 4 Drawing Sheets

INJECTION MOLDING OF FABRIC REINFORCED ELASTOMERIC DIAPHRAGMS

This is a continuation-in-part application of U.S. Pat. application Ser. No. 07/167,613 filed Mar. 14, 1988, now abandoned.

BACKGROUND OF THE INVENTION

The present invention relates generally to the formation of thin walled fabric-reinforced rolling elastomeric diaphragms. Diaphragms are in widespread use in a number of applications where a differential pressure is applied to a piston in order to provide a mechanical displacement output. The diaphragm acts as a flexible pressure barrier which is, for example, clamped to the walls of a cylinder at its outer edges while the inner circumference is attached to a piston such that the piston is free to move within the cylinder in response to pressures applied to the head of the piston.

Traditionally, such diaphragms were formed solely of a gas impermeable elastomeric material which provided the desired flexibility and resilience. These types of elastomeric diaphragms are formed either by injection molding or by compression molding operations.

Elastomeric diaphragms having a fabric-reinforced backing material integral therewith are also available for certain types of applications. When properly constructed, fabric-reinforced elastomeric diaphragms offer a number of particular advantages over diaphragms formed completely of elastomer. For example, a fabric-reinforced elastomeric diaphragm will not stretch during actuation under the exertion of an applied force, therefore, the entire pressure differential is applied to the piston head and is offering increased overall life of the diaphragm. Currently, there are two methods of making a fabric-reinforced elastomeric diaphragm. The first method of forming is to calendar a flat sheet of elastomer and apply to one side thereof a sheet of fabric reinforcement prior to curing of the elastomeric material. This is a perfectly acceptable method of forming a flat diaphragm. However, if the amount of actuation travel or rolling, of an application is large relative to the allowable diaphragm diameter, a complex, three dimensional shape is required of the diaphragm, the diaphragm has to be compression molded in a specific molding tool to form the desired complex shape. During this process, if a flat, calendared sheet is used, the elastomeric material tends to locally migrate through the fabric resulting in sections where the fabric material is present on the high pressure side of the diaphragm. This condition is known as bleed through and is fatal when a pressure is applied to the high pressure side of the diaphragm. The pressure tends to pass through the exposed fabric reinforcement material and separate the elastomeric material from the fabric, thereby causing local blistering or ballooning of the elastomer and failure of the diaphragm.

The second method of forming a fabric-reinforced elastomeric diaphragm utilizes a compression mold forming device wherein a fabric reinforcement preformed to a configuration similar to the finished part and a slug of elastomeric material, both applied by hand, are compressed together and cured within a compression molding device. Preforming of the fabric reinforcing material is required to prevent migration of the fabric and bleed through of the elastomer from occurring during the curing operation. Also, the slug dimensions are carefully determined and the slugs are carefully prepared in order to prevent fabric weave distortion or tearing during flow of the elastomer across and into the fabric. However, the hand operation associated with the fabrication of the fabric-reinforced elastomeric diaphragm within the compression molding device is time-consuming, costly and extremely labor intensive.

The elastomeric diaphragms resulting from either of the above methods of forming have physical properties which are well known in the art. Generally, rolling, convoluted elastomeric diaphragms have thin cross-sectional wall thicknesses, on the order of from 0.006 inches to 0.035 inches in thickness depending upon the performance requirements of the diaphragm application. Wall thicknesses greater than 0.035 inches tend to become too stiff to make good rolling diaphragms. The fabric-reinforcement materials are very thin, on the order of 0.002 to 0.008 inches and can be single or multiply as required by the application even when using very soft or low modules elastomers. The fabric denier, or thread weight, is minimized in order to maximize the flexibility or minimize rolling resistance during actuation of the diaphragm and therefore its sensitivity to the pressure fluctuations which are being sensed. The fabric is also selected to be strong enough to withstand both the operating proof pressures and the dynamic flexing which can cause fatigue failure even at low operating pressures.

Additionally, the elastomers used within the forming process are selected to obtain the requisite standardized tensile strength, ultimate elongation, and tear resistance, i.e. toughness properties. To achieve the standardized end properties, elastomers having high molecular weight and high viscosities in the uncured state are required. Elastomeric polymers with lower molecular weights and viscosities tend to have reduced physical properties. The appropriate elastomers may generally be defined as having viscosities of 500 poise minimum, and preferably about 1000 poise, in the uncured state. The combination of thin diaphragm wall thicknesses and high viscosity elastomers have therefore constrained the methods of forming thinwalled fabric-reinforced flexible elastomeric diaphragms to the calendaring and compression molding processes above. 35 These processes are limited in the first case to flat diaphragms, and in the second case by the labor intensive, high manufacturing costs associated with compression molding.

Accordingly, it would be advantageous to have a method of forming a thin walled fabric-reinforced elastomeric diaphragm which eliminates migration of the fabric material, reduces the amount of human operating time, and is cost effective.

The present invention contemplates the forming of fabric-reinforced, contoured thin-walled, flexible, rolling elastomeric diaphragms in an injection molding process, which process eliminates the fabric migration and fabric bleed through, as well as problems associated with fabric weave separation or tearing during injection molding. The present invention is adaptable to automation in the forming of reinforced contoured elastomeric diaphragms while eliminating labor intensive operations.

SUMMARY OF THE INVENTION

The present invention starts with a precut sheet of thin fabric-reinforcing material. This sheet is then preformed into a shape approximating the complex shape which is required for the diaphragm. During this process, a fabric primer may be applied to the fabric in order to aid adhesion of the elastomer onto the fabric in the final part. The fabric is then placed within an injection molding device between a top mold plate and a bottom mold plate. Elastomeric material is subsequently injected through a port within one of the mold plates, the elastomeric material flows radially outward from the port, first spreading over and then penetrating and bonding to the fabric reinforcement material until the cavity between the top mold plate and bottom mold plate is filled with elastomeric material. A slight amount of elastomeric material may be allowed to overflow into a relief groove cut within the outer radius of the top mold plate. The elastomeric material is then cured for the required period of time prior to removal of the formed thin walled fabric-reinforced contoured elastomeric diaphragm from the injection molding device. The resulting thin walled fabric-reinforced contoured elastomeric diaphragm may then be trimmed of excess or unwanted material to form the final shape. Through the novel design of the injection port and mold cavity, in combination with carefully controlled viscosity properties and injection pressures for the elastomer, the thin walled fabric-reinforced contoured elastomeric diaphragms may be fabricated without migration of the fabric material or distortion of the weave of the fabric-reinforcement material.

It is thus an object of the present invention to provide a method of forming a thin walled fabric-reinforced elastomeric diaphragm having a complex shape.

It is a further object of the invention to provide a thin walled fabric-reinforced contoured elastomeric diaphragm which has the fabric-reinforcement material substantially only on one side of the diaphragm.

It is a further object of the invention to provide a unique injection mold for the forming of a fabric-reinforced elastomeric diaphragm.

These and other advantages, objects, and features of the present invention will become more apparent after considering the following description taken in conjunction with the illustrated embodiments in the accompanying drawings.

DESCRIPTION OF THE PREFERRED EMBODIMENT

Figure 1A:
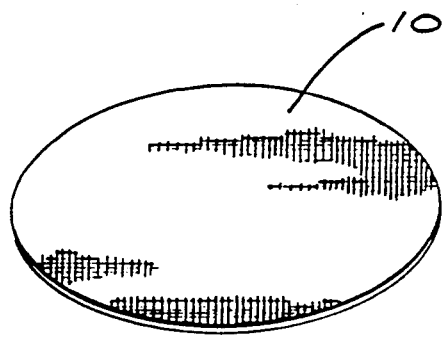
FIG. 1A through 1D illustrate sequential steps in the prior art process of forming a fiber-reinforced elastomeric diaphragm by a compression molding technique.
Figure 1B:
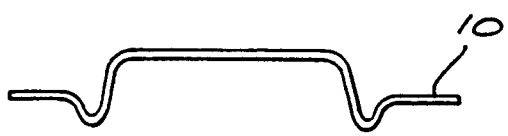
Figure 1C:
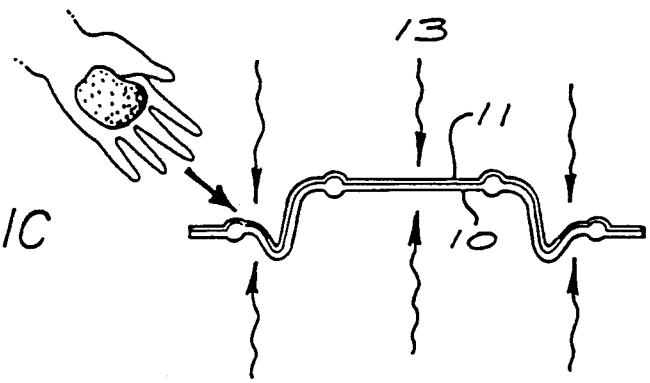
Figure 1D:
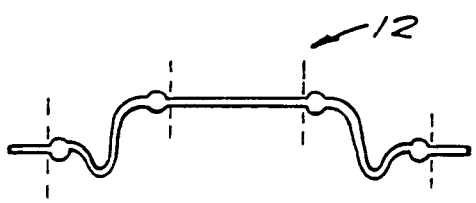

Within FIG. 1 the prior art method of forming a typical fabric-reinforced thin-walled, rolling, highly flexible elastomeric diaphragm is illustrated. Letter A designates the pictorial view of a fabric material 10 cut into a circular shape. Step B shows the fabric material 10 preformed into a complex shape in profile view. Step C illustrates the addition of the elastomeric material 11 onto the fabric material 10 and the formation of the fiber-reinforced elastomeric diaphragm 12 within a compression molding process as illustrated by the application of heat and pressure 13. Step D illustrates the fabric-reinforced elastomeric diaphragm 12 removed from the compression molding device and ready for trimming to final form.

FIG. 2 represents the method of forming a fabric-reinforced elastomeric diaphragm by the method of the present invention. Within FIG. 2, step A depicts the fabric material 10 cut to a generally circular shape. Step B shows the profile of the preformed complex shape for the fabric material 10 prior to the fabric material 10 being placed within the injection molding apparatus. Step C depicts the injection molding apparatus wherein the injection molding apparatus includes a top die 14 and a bottom die 15 which combine to define a diaphragm cavity 17 located between the top die face 18 of top die 14 and a bottom die face 19 of the bottom die 15. The fabric material 10 in its preformed shape is placed within the diaphragm cavity 17 and clamped at its outer edges between the top die 14 and bottom die 15. The top die 14 includes injection port 16 configured to deliver elastomeric material 11 at the center of the diaphragm cavity 17. The top die 14 also includes runners 20 cut into the top die face 18 so as to extend radially outwardly from said injection port 16 to direct the flow of the elastomer preferentially across the fabric surface onto the high pressure side of the diaphragm resulting in the fabric support being on the low pressure side therefore supporting the rubber during pressure actuation. The diaphragm cavity 17 may also include an inner bead 22 and an outer bead 23 wherein the diaphragm cavity 17 has a substantially larger thickness with respect to the remainder of the diaphragm cavity 17. An overflow port 21 may also be included circumferentially outwardly of the outer bead 23 and cut into either die face 18 or 19.

The elastomeric material 11 is injected under high pressure through the injection port 16. The elastomer 11 first puddles on top of the fabric material 10 within the cavity 17, then flows radially outward over the fabric 10 before penetrating the fabric weave until the elastomer completely fills the diaphragm cavity 17. The elastomeric material 11 is then cured by the application of heat and pressure. Subsequently, Step D shows the thin walled fabric-reinforced elastomeric diaphragm 12 after removal from the injection molding apparatus. It may then be desirable to trim the thin walled fabric-reinforced elastomeric diaphragm 12 radially inwardly of the inner beads 22 and radially outwardly of the outer beads 23 to form the desired final complex contoured shape for the thin walled fabric-reinforced elastomeric diaphragm 12 as illustrated by E within FIG. 2.

Figure 3:
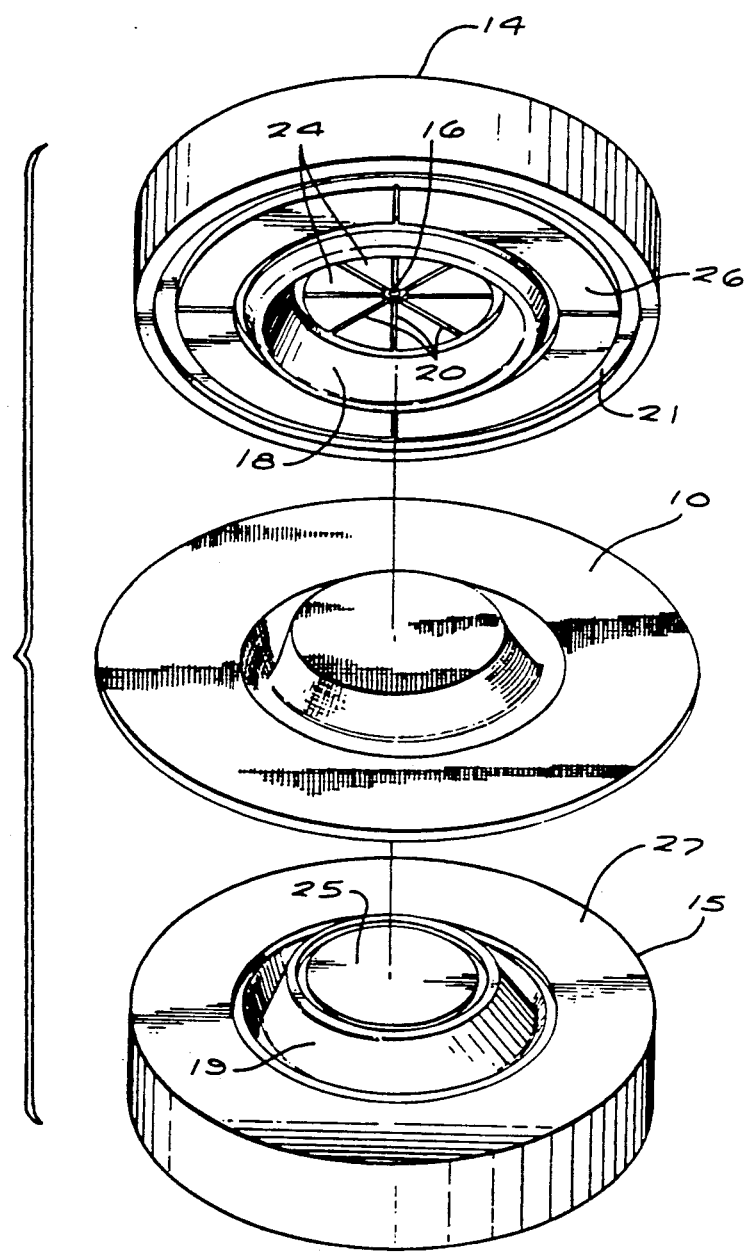
FIG. 3 is a detailed view of the injection molding apparatus top and bottom forming dies of the present invention.

FIG. 3 shows a more detailed view of the top die 14 and bottom die 15. Depicted in the top die 14 is the top die face 18 which includes the runners 20 and the injection port 16, top die 14 may also include the inner bead 22, outer bead 23 and the overflow port 21. The bottom die 19 is generally depicted as having the contoured bottom die face 19 as well as the optional inner bead 22 and outer bead 23 therein. The top die 14 may also include lands 24 interposed between the runners 20 within the top die face 18 which lands 24 may be formed so as to fixedly clamp the fabric material 10 at its central locations upon a flat portion 25 of the bottom die face 19. The fabric material 10 may also be clamped at its outer diameter sections between a top flat ring portion 26 of the top die face 18, and a bottom flat ring portion 27 of the bottom die face 19. By the use of very close tolerances between these sections of the top die face 28 and the bottom die face 19, the fabric material 10 in its preformed shape may be held in place. It should be noted that the fabric 10 is not stretched between the inner and outer clamped areas. The diaphragm cavity 17 as shown has a relatively thin cross-sectional thickness with respect to its diameter. Cross-sectional thicknesses within the convoluted portion of diaphragm cavity 17 are preferably in the range of 0.006 inches to 0.035 inches for thin-walled, highly flexible fabric-reinforced elastomeric diaphragms 12. The elastomeric material 11, injected via the injection port 16 into the diaphragm cavity 17, is radially dispersed via the runners 20 to facilitate the uniform filling of the diaphragm cavity 17. The runners 20 may typically be on the order of 0.005 to 0.05 inches in depth. However, the elastomer naturally follows the runners 20 due to the lower resistance to flow in the expanded volume.

Figure 4:
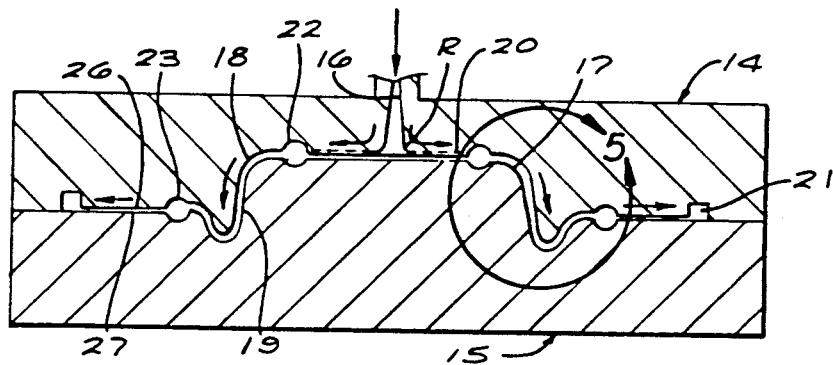
FIG. 4 is a cross-sectional view showing the injection molding apparatus mold portion of the present invention.

The injection of the elastomeric material 11 is generally shown within FIG. 4, wherein the arrows indicate the direction of elastomeric material flow. The elastomeric material is injected under high pressures, in the range of between 200 and 2000 pounds per square inch. Also shown is the geometry of the injection port 16 which generally truncates towards the mold cavity 17 and features a flared radius R at the intersection with the mold cavity 17. It has been found that a squared off intersection tends to direct the elastomer into the fabric weave before the elastomer flows radially outward, thus placing great stress on the weave causing separation and distortion. The radius R allows the elastomer to flow radially outward with less resistance to flow, thus, in coordination with the benefit of the runners 20, flowing over the fabric material 10 before penetrating the fabric weave, instead of flowing within the weave of the fabric material 10, thereby reducing stress within the fabric material 10. Within the constraints of the very thin cross-sectional thickness of the cavity 17, combined with the very thin and loose weave fabrics and the high viscosity of the elastomeric material being injected, the "flow over then penetrate" characteristic of the present invention is critical to making an acceptable diaphragm. Previous methods have resulted in unacceptable tearing and/or distortion of the reinforcing fabric weave structure or bleed through and wandering of the fabric in the diaphragm wall. When the elastomeric material 11 has completely filled the diaphragm cavity 17, the elastomeric material 11 may continue to flow radially outwardly into the overflow port 21.

Figure 5:
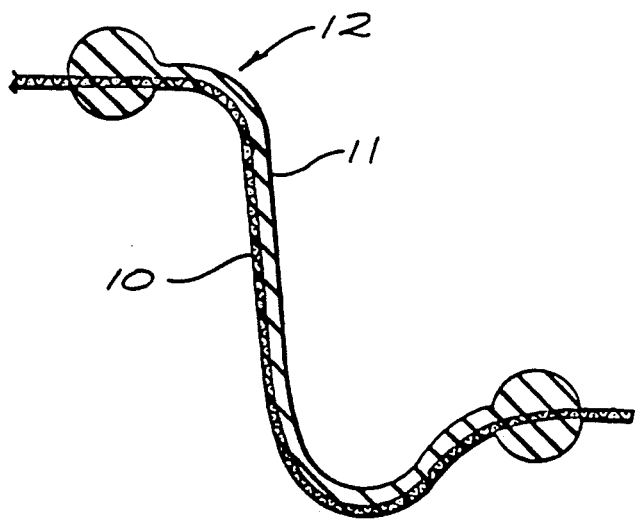
FIG. 5 is a cross-sectional view of a portion of a fabric-reinforced elastomeric diaphragm.
Figure 2A:
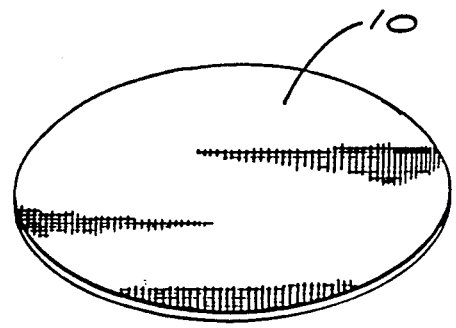
FIGS. 2A through 2E, on the other hand, illustrate sequential steps in the method of forming a fiber-reinforced elastomeric diaphragm according to the present invention.
Figure 2B:
Figure 2C:
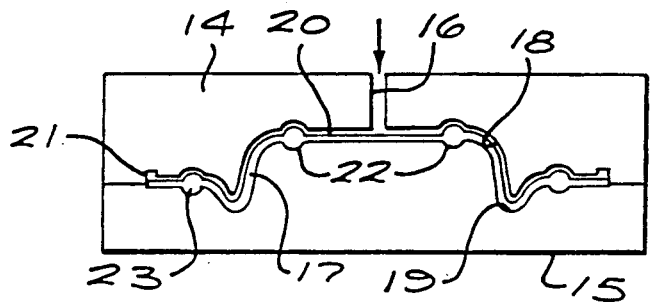
Figure 2D:
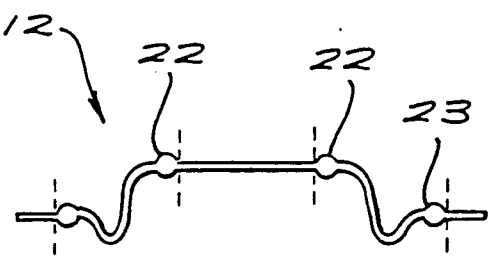
Figure 2E:
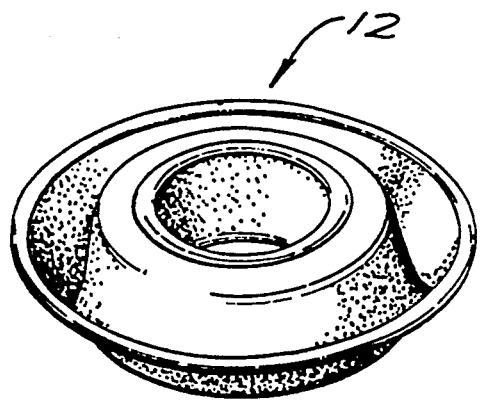

A detailed cross-sectional view of a portion of the desired resulting fiber-reinforced elastomeric diaphragm 12 is shown within FIG. 5. Herein, it can be seen that the fabric material 10 is located substantially entirely on one side of the fabric-reinforced elastomeric diaphragm 12, while the elastomeric material 11 is located on the other side thereof. The elastomeric material 11 also penetrates the fabric material 10 and bonds thereto. Additionally, within the inner bead 22 and outer bead 23 sections, the elastomeric material 11 has penetrated and formed a bead on the fabric side of the fabric-reinforced elastomeric diaphragm 12.

Figure 6:
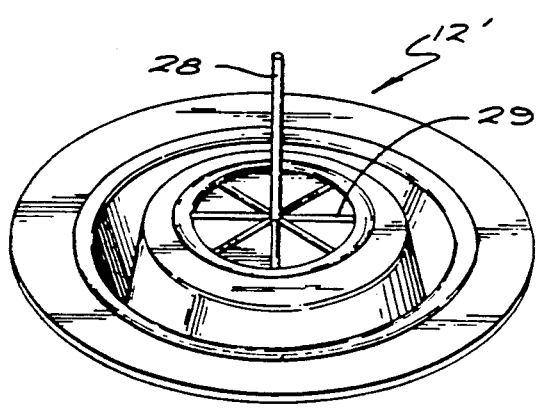
FIG. 6 is a pictorial view of a diaphragm formed by the process of the present invention prior to the trimming thereof.

FIG. 6 shows the fabric-reinforced elastomeric diaphragm 12 after removal from the injection molding apparatus of FIG. 4. Within FIG. 6, an elastomer column 28 projects from the center of the fabric-reinforced elastomeric diaphragm 12. Additionally, ridges 29 diverge radially outwardly from the elastomer column 28 towards the inner bead 22 of the fabric-reinforced elastomeric diaphragm 12. The elastomer column 28 is formed within the injection port or sprue 16 of the top die 14, while the ridges 29 are formed within the runners 20 of the top die 14. The excess material radially inward of the inner bead 22 and radially outward of the outer bead 23 may be trimmed if desired to produce the final shape of the fabric-reinforced elastomeric diaphragm 12 as shown within FIG. 7.

Figure 7:
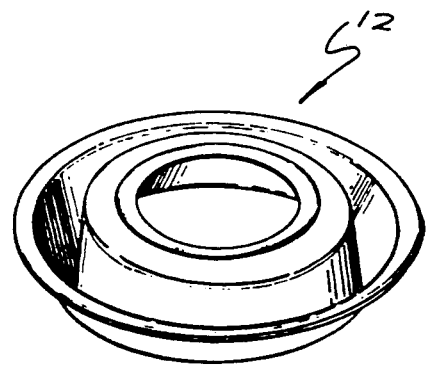
FIG. 7 is a pictorial view of a diaphragm formed by the process of the present invention in its final form.

While the mold apparatus of FIGS. 2-4 depicts a mold geometry for forming the diaphragm of FIGS. 6 and 7, which is generally referred to as a convoluted diaphragm, the present invention is also equally applicable to other diaphragm configurations such as top hat, double tapered top hat, and irregular (circular and non-circular), any of which may optionally include either inner and/or outer beads.

During the injection of the elastomer into the mold cavity 17, the high viscosity elastomer flows over and permeates the fabric material 10, subjecting the fabric material 10 to stress which may tend to separate or distort the weave. To prevent this type of separation, the rheology of the elastomer and the plasticizing agent must be matched to the fabric material 10. This invention is generally applicable to any elastomer, either thermosetting or thermoplastic, that is specifically designed by its formula to have an injection moldable consistency. The adjustment of a specific elastomeric formula, to meet both the particular injection molding process conditions and the specific requirements of a particular part design including the type of fabric, necessary to successfully manufacture a quality part, is made possible by the proper selection of appropriate ingredients, especially the processing or plasticizing agent or aid. The types of elastomers contemplated by this invention, as defined by the American Society of Testing and Materials (ASTM), includes ASTM Designation: D1418-85: "M" class rubbers having a saturated chain of the polymethylene type, "R" class rubbers having an unsaturated carbon chain including natural rubbers and synthetic rubbers derived at least partly from diolefins, "Q" class rubbers having silicon and oxygen in the polymer chain, "U" class rubbers having carbon, oxygen, and nitrogen in the polymer chain, and thermoplastic elastomers including YSBR, YXSBR and YBPO. While the above types of elastomers are all potentially applicable, only those blended to have a high molecular weight and correspondingly high viscosity on the order of 500 poise minimum, and preferably about 1000 poise, will produce useable fabric-reinforced elastomeric diaphragms.

The types of fabric material contemplated by this invention include nylon, polyethylene terephalate, polyester, glass, cotton, silk, wool, as well as the aromatic polyamides with the trade names of NOMEX and KEVLAR, and fluorocarbons such as polytetrafluoroethylene available under the trade name TEFLON. These fabrics are woven into a thin sheet having a relatively open weave and a cross sectional thickness on the order of between 0.002 to 0.008 inches. While the types of elastomers listed above are generally chemically compatible with the fabric materials listed, the specific elastomer and fabric must be chosen based on the desired properties such as the thickness, flexibility, and strength of the fabricated diaphragm. Additionally, the rheology of each elastomer, i.e. its viscosity and flow characteristics, must be considered in choosing the fabric material.

In one test run fabrication of a thin walled fabric-reinforced elastomeric diaphragm in accordance with the present invention, a liquid silicone rubber, commercially available under the trade name Dow Corning 590 A/B silastic having a viscosity of about 1000 poise was injected into a mold containing a preformed nylon fabric material. The elastomer was injected at a pressure of 400 psi and cured for 30 seconds at a temperature of 270 F. The resulting diaphragm extreme had a wall thickness of 0.008 inch and exhibited extreme flexibility, excellent adhesion of the elastomer to the fabric, no separation of the fabric weave, and no deleterious migration of the fabric material.

Although the invention is disclosed in what is presently considered to be the preferred embodiment, it may be appreciated that modifications and variations of the invention will occur to those skilled in the art. Accordingly, the description herein is intended to illustrate the present invention, but not limit the scope thereof. The invention is therefore defined only by the scope of the appended claims.

What I claim is:

1. A method of forming a complex shaped thin walled fabric-reinforced rolling elastomeric diaphragm comprising:
    forming a thin woven fabric material into a complex shape;
    clamping said thin fabric material within a mold cavity of an injection molding machine; said mold cavity having a maximum cross-sectional thickness of approximately 0.035 inches corresponding to the rolling portion of said diaphragm;
    preparing an elastomeric material having a high viscosity of at least 500 poise for injection molding;
    injecting said high viscosity elastomeric material into said mold cavity under a pressure of between 200 to 2000 pounds per square inch;
    directing the flow of said elastomeric material over said fabric material, then allowing said elastomeric material to penetrate the fabric material thereby preventing localized stress concentrations and weave distortion within said fabric material; and
    applying heat and pressure to cure said elastomeric material.

2. The method of claim 1 further comprising:
    maintaining the injection pressure at between 200 and 2000 psi; and
    controlling the temperature of said elastomeric material to promote uniform filling of said mold cavity and prevent distortion of said fabric material weave.

3. The method of claim 2 wherein said clamping step further comprises:
    providing a bottom die having a bottom die face defining a desired low pressure side of said elastomeric diaphragm;
    placing said formed fabric material adjacent to said bottom die face;
    providing a top die having a top die face defining a desired high pressure side of said elastomeric diaphragm, said top die including an injection port allowing injection of said elastomeric material into said mold cavity, said injection port including a flared radius inlet to said mold cavity; and
    affixing said top die to said bottom die such that said top die face and said bottom die face combine to define said mold cavity and said fabric material is fixedly held within said mold cavity.

4. The method of claim 3 wherein said top die further includes a plurality of runners relieved into said top die face running radially outward from said injection port.

5. The method of claim 2 further comprising:
    said fabric material selected from the group consisting of nylon, polyester, glass, cotton, silk, wool, polyethylene terephalate, aromatic polyamide, and polytetrafluorocthylene; and
    forming said fabric material into a woven assemblage having a thickness of between 0.002 and 0.008 inches.

6. The method of claim 2 further comprising:
    an elastomeric material selected from the group consisting of ASTM Designation: D1418-85 elastomers of the type "M" class thermosetting rubbers, "R" class thermosetting rubbers, "Q" class thermosetting rubbers, "U" class thermosetting rubbers and thermoplastic elastomers.

7. The method of claim 6 further comprising:
    mixing the selected elastomeric material with a plasticizing agent prior to injection into said mold cavity.

8. The method of claim 2 further comprising:
    permeating and bonding said elastomeric material to said woven fabric material.

9. The method of claim 2 further comprising:
    treating said fabric material with a fabric primer to allow increased retention of said complex shape and promote bonding to said elastomeric material.

10. The method of claim 1 further comprising:
    controlling the viscosity of said elastomer to between 900 and 1100 poise;
    maintaining the injection pressure at between 300 and 500 psi; and
    controlling the temperature of said elastomeric material to promote uniform filling of said mold cavity and prevent distortion of said fabric material weave.

11. The method of claim 10 further comprising:
    said fabric material selected from the group consisting of nylon, polyester, glass, cotton, silk, wool, polyethylene terephalate, aromatic polyamide, and polytetrafluoroethylene; and
    forming said fabric material into a woven assemblage having a thickness of between 0.002 and 0.008 inches.

12. The method of claim 10 further comprising:
    an elastomeric material selected from the group consisting of ASTM Designation: D1418-85 elastomers of the type "M" class thermosetting rubbers, "R" class thermosetting rubbers, "Q" class thermosetting rubbers, "U" class thermosetting rubbers and thermoplastic elastomers.

* * * * *